United States Patent
Jacobs et al.

(10) Patent No.: US 7,693,915 B2
(45) Date of Patent: Apr. 6, 2010

(54) METHOD OF DISPLAYING A TOOL TIP WITH FILTERED CONTENTS

(75) Inventors: Suren Ephraim Richard Jacobs, Northbridge (AU); Christopher Mark Paola, Hornsby (AU); Rob Sangster, Linley Point (AU)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 11/288,159

(22) Filed: Nov. 29, 2005

(65) Prior Publication Data

US 2006/0136456 A1 Jun. 22, 2006

(30) Foreign Application Priority Data

Nov. 30, 2004 (AU) .............................. 2004233539

(51) Int. Cl.
*G06F 7/00* (2006.01)
*G06F 17/30* (2006.01)
(52) U.S. Cl. .................. 707/803; 707/804; 715/762; 715/838
(58) Field of Classification Search ............... 707/1–10, 707/100–104.1, 200–206; 715/513, 515, 715/516, 727, 728, 763, 810, 835–838, 846, 715/209, 210, 234, 762
See application file for complete search history.

(56) References Cited

U.S. PATENT DOCUMENTS

| 5,297,253 | A | 3/1994 | Meisel ....................... 395/160 |
|---|---|---|---|
| 5,999,190 | A | 12/1999 | Sheasby et al. ............. 345/431 |
| 6,694,326 | B2* | 2/2004 | Mayhew et al. ............. 707/102 |
| 6,785,683 | B1 | 8/2004 | Zodik et al. ................. 707/101 |
| 2002/0075329 | A1 | 6/2002 | Prabhu et al. ............... 345/854 |
| 2003/0137541 | A1* | 7/2003 | Massengale et al. ........ 345/764 |
| 2003/0146939 | A1 | 8/2003 | Petropoulos et al. ........ 345/810 |
| 2004/0095371 | A1 | 5/2004 | Haynes et al. .............. 345/711 |
| 2004/0205514 | A1 | 10/2004 | Sommerer et al. ....... 715/501.1 |
| 2005/0108643 | A1* | 5/2005 | Schybergson et al. ....... 715/713 |

OTHER PUBLICATIONS

Catarci et al., Iconic and diagrammatic interfaces: an integrated approach, Oct. 8-11, 1991, IEEE, 199-204.*
Jaehyuk Cha et al., Browsing multimedia objects via composite icons, Oct. 22-25, 1995, IEEE, vol. 5, 3926-3931.*
Notice of Acceptance in corresponding Australian Application No. 2004233539, dated Dec. 3, 2007.

* cited by examiner

*Primary Examiner*—Jean B Fleurantin
(74) *Attorney, Agent, or Firm*—Fitzpatrick, Cella, Harper & Scinto

(57) ABSTRACT

A method of browsing media items is disclosed, the method comprising the steps of displaying (802) representations of the media items on a display (914), defining (803) a filter criterion for a display pointing device (903), browsing (804) the displayed representations of the media items by moving the pointer of the pointing device about the display (914), and displaying (804) in a pop-up window, while the pointer of the pointing device (903) is designating a selected one of the displayed representations of the media items, a representation of the designated media that satisfies the filter criterion.

12 Claims, 15 Drawing Sheets

METHOD OF DISPLAYING A TOOL TIP WITH FILTERED CONTENTS

FIELD OF THE INVENTION

The current invention relates to media file browsing and in particular to applying filters to collections of media files.

BACKGROUND

Computers are often used for managing and storing digital photos, videos, audio files, and other similar "media items", which are also referred to as "media files". Typically, media items are organised for graphical display in "folders", which can be logically arranged and graphically displayed as hierarchical "folder trees". Folders are graphical icons that logically reference media items that are referred to as being "contained" in the folders.

Metadata can be associated with media items. Metadata may include the location where the media file was captured, the size of the media file and so on.

Computer applications are currently available that are used for browsing and managing media files on a computer. Some of these applications can perform filtering, thereby displaying only media items that meet specified criteria.

SUMMARY

It is an object of the present invention to provide an improved method and apparatus for browsing media files on a computer. The disclosed arrangements that are referred to as "tool tip browsing" techniques, and provide a further level of filtering, in addition to the filtering capability already provided by current browser applications. The disclosed tool tip browsing approach enables filter criteria to be associated with a pointing device such as a mouse. When the pointer of such a pointing device is used, for example, to designate a folder containing a number of media items, a pop-up window associated with the pointing device, also referred to as a tool tip, displays a filtered view of those media items in the folder whose associated metadata meets (ie matches) the aforementioned tool tip filter criteria. The tool tip filter criteria are independent of the filter criteria used by an associated browser application.

According to a first aspect of the present invention, there is provided a method of browsing media items, said method comprising the steps of:

(a) presenting, on a display, graphical icons referencing the media items;

(b) defining a filter criterion to select a desired media item; and (c) displaying in a pop-up window, when a pointer of a pointing device designates one of the displayed icons, a representation of a media item that satisfies the filter criterion from among a plurality of media items related to the designated icon.

According to another aspect of the present invention, there is provided a method of browsing media items, said method comprising the steps of:

(a) presenting, on a display, graphical icons referencing the media items;

(b) defining a filter criterion to select a desired media item;

(c) designating one of the displayed icons with a pointer of a pointing device; and (d) displaying in a pop-up window a representation of a media item that satisfies the filter criterion from among a plurality of media items related to the designated icon.

According to another aspect of the present invention, there is provided an apparatus for browsing media items, said apparatus comprising:

(a) means for presenting, on a display, graphical icons referencing the media items;

(b) means for defining a filter criterion to select a desired media item; and (c) means for displaying in a pop-up window, when a pointer of a pointing device designates one of the displayed icons, a representation of a media item that satisfies the filter criterion from among a plurality of media items related to the designated icon.

According to another aspect of the present invention, there is provided a computer medium having recorded thereon a computer program for directing an apparatus to implement a method for browsing media items, said program comprising:

(a) code for presenting, on a display, graphical icons referencing the media items;

(b) code for defining a filter criterion to select a desired media item; and (c) code for displaying in a pop-up window, when a pointer of a pointing device designates one of the displayed icons, a representation of a media item that satisfies the filter criterion from among a plurality of media items related to the designated icon.

Other aspects of the invention are also disclosed.

BRIEF DESCRIPTION OF THE DRAWINGS

One or more embodiments of the present invention will now be described with reference to the drawings in which.

DETAILED DESCRIPTION INCLUDING BEST MODE

Figure 1:
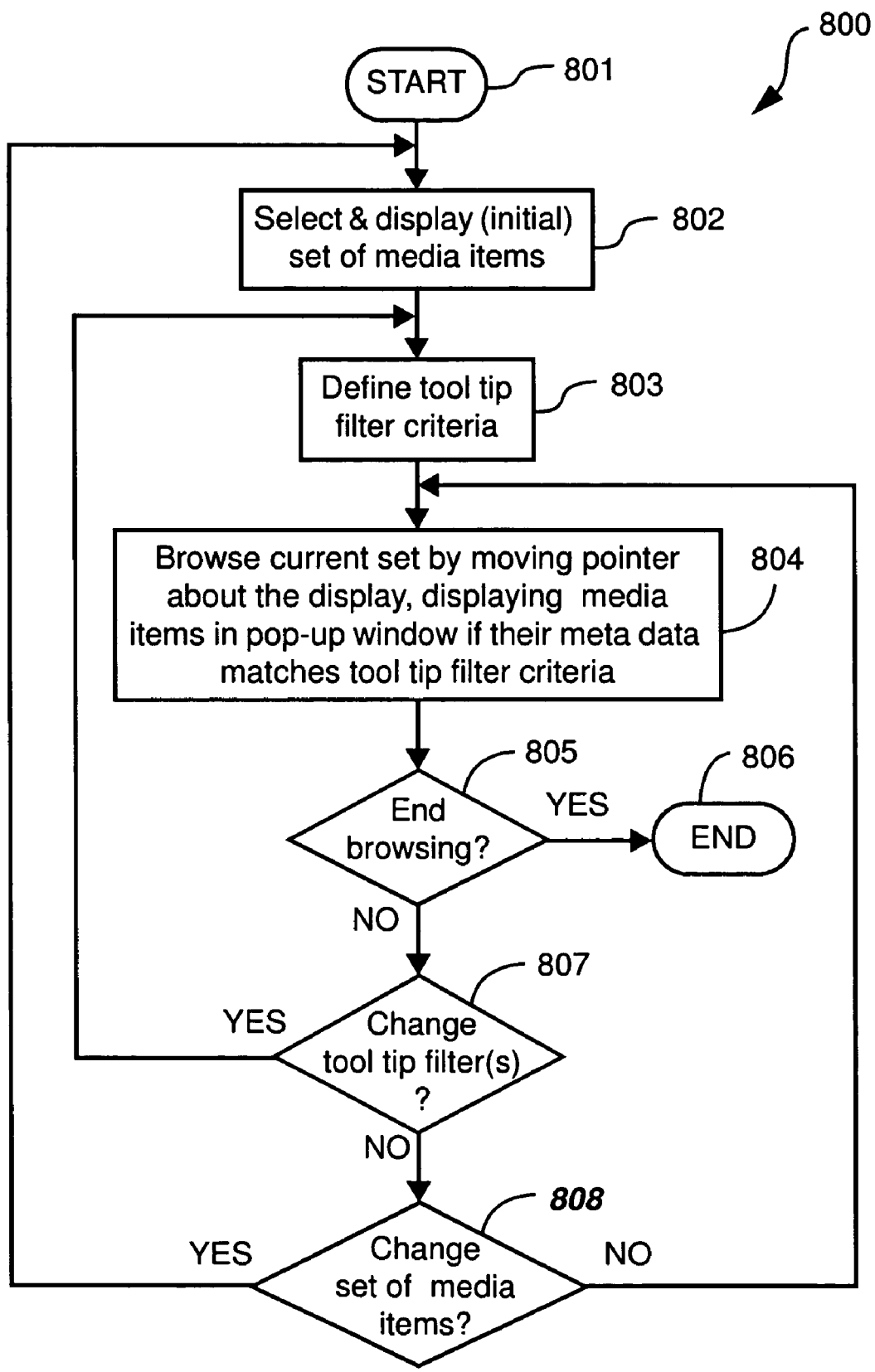
FIG. 1 shows one example of a process for browsing media files according to the disclosed tool tip browsing method.

It is to be noted that the discussion contained in the "Background" section which relates to prior art arrangements relates to discussions of devices which may form public knowledge through their use. This discussion should not be interpreted as a representation by the present inventor(s) or patent applicant(s) that such devices in any way form part of the common general knowledge in the art.

Where reference is made in any one or more of the accompanying drawings to steps and/or features, which have the same reference numerals, those steps and/or features have for the purposes of this description the same function(s) or operation(s), unless the contrary intention appears.

The present specification also discloses apparatus for performing the operations of the tool tip browsing methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present invention also implicitly discloses a computer program, in that it would be apparent to the person skilled in the art that the individual steps of the preferred tool tip browsing method described herein are to be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing the spirit or scope of the invention. Furthermore one or more of the steps of the computer program may be performed in parallel rather than sequentially.

Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

The aforementioned preferred method(s) comprise a particular control flow. There are many other variants of the preferred method(s) which use different control flows without departing the spirit or scope of the invention. Furthermore one or more of the steps of the preferred method(s) may be performed in parallel rather sequential.

FIG. 1 shows one example 800 of a process for browsing media files according to the disclosed tool tip browsing method. The process 800 commences with a START step 801, after which a step 802 selects and displays an (initial) set of media items on a video display 914 (see FIG. 5). As will be described in more detail in regard to FIG. 6, the displayed media items may be shown in the context of a folder tree 118 in a folder tree area 120, and/or as individual media items or media item sub-folders such as 115 in folders such as 114 in a media file viewing area 130.

Figure 5:
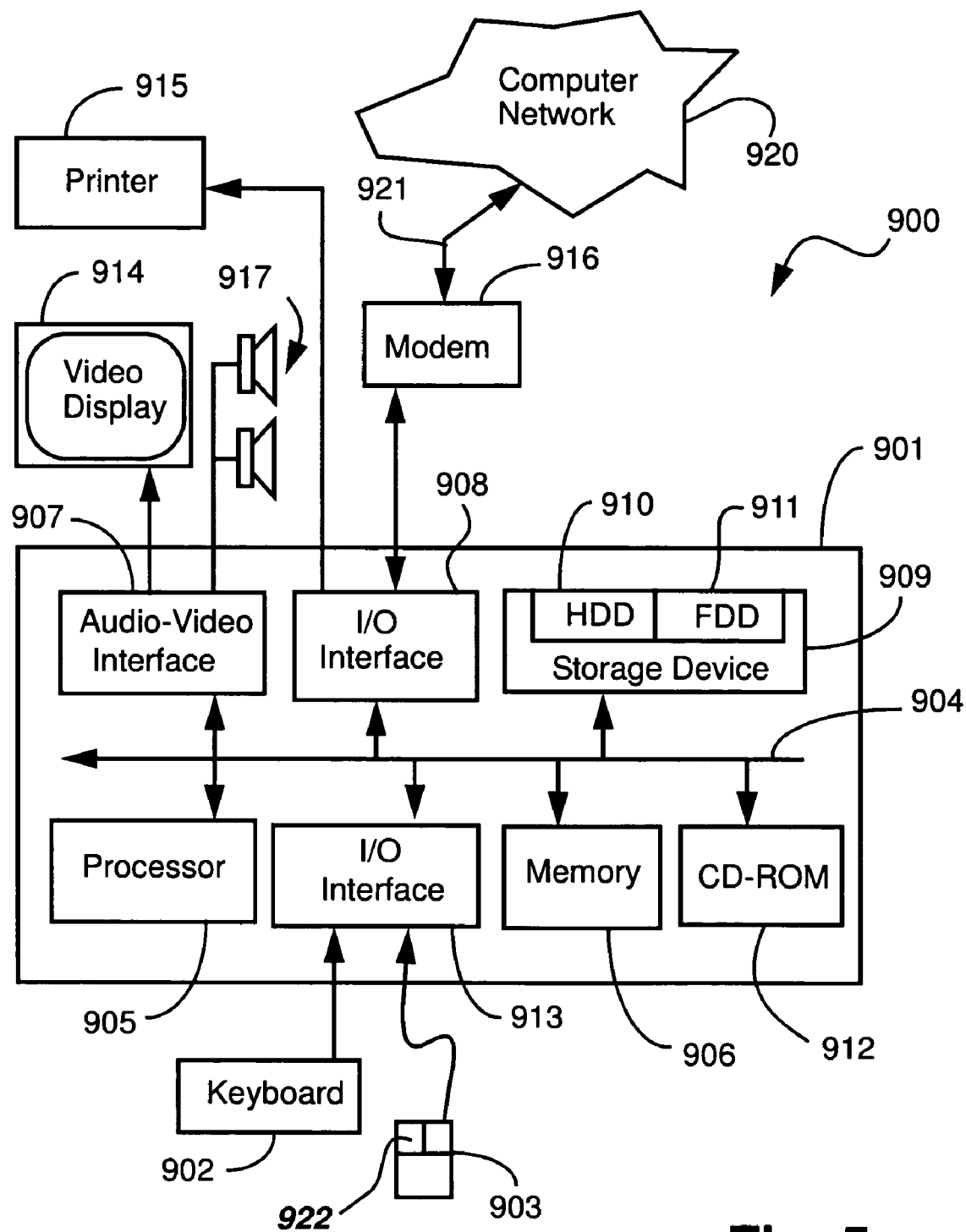
FIG. 5 is a functional block diagram of a general-purpose computer upon which described tool tip browsing methods can be practiced.

Thereafter, a step 803 defines tool tip filter criteria, preferably using mouse controls such as a "mouse wheel", and left/right mouse buttons on a mouse 903 (see FIG. 5). A subsequent step 804 enables a user to browse the current set of displayed media items on the video display 914 by moving a pointer (such as 201 in FIG. 7) associated with the mouse 903 about the display 914. When the aforementioned pointer is within a predefined distance of a graphical icon (such as the folder 202 in FIG. 7) on the video display 914, a pop-up window, also referred to as the tool tip or the tool tip window, is displayed on the display 914, preferably in the vicinity of the aforementioned pointer. This pop-up window displays representations of media items and/or folders, in the folder 202, having associated metadata that satisfies the tool tip filter criteria set in the step 803. In a preferred arrangement, the tool tip shows, in a flat structure, all media items whose metadata satisfies the aforementioned tool tip filter criteria. Since in general the folder 202 may include sub-folders to any arbitrary hierarchical depth, it is possible to limit the extent or depth of the search to a specified number of hierarchical levels below the folder in question (202 in the present example).

If the graphical object designated by the pointer is a folder, and if the folder contains media items whose associated metadata satisfies the filter criteria set in the step 803, then the pop-up window will display those media items. The pop-up window will also, in a preferred arrangement, display other useful information such as the number of media items in the designated folder which satisfy the defined filter criteria, the number of media items in both the designated folder and all folders contained in the designated folder which satisfy the defined filter criteria, the total number of sub-folders in the designated folder and so on.

A following step 805 determines if the present browsing session is to be terminated. If this is the case, then the process 800 follows a YES arrow to an END step 806. If, on the other hand, the step 805 returns a logical FALSE value, then the process 800 follows a NO arrow to a step 807.

The step 807 determines if the tool tip filter criteria that were set in the step 803 are to be changed. If this is the case, then the process 800 is directed by a YES arrow back to the step 803. If, on the other hand, the step 807 returns a logical FALSE value, then the process 800 follows a NO arrow to a step 808.

The step 808 determines if the set of media item selected in the step 802 are to be changed. If this is the case, then the process 800 follows a YES arrow back to the step 802. If, on the other hand, the step 808 returns a logical FALSE value, then the process 800 follows a NO arrow back to the step 804, enabling the user to continue browsing the presently displayed set of media items.

It is noted that the step 802 which selects and displays an initial set of media items can be performed as a first stage of filtering using presently available filtering capabilities of current browser applications. The provision of a second layer of filtering in the step 803 provides an improved filtering capability to the user.

The pop-up window can be "opaque", thereby completely obscuring any graphical information appearing on the display 914 below the tool tip. Alternately, the pop-up window can be transparent, or translucent, thereby enabling display information on the display 914 beneath the pop-up window to be made visible. This latter arrangement preserves the context of the display for the user. The preservation of context of the display for the user can also be affected by the relative position of the pop-up window and the pointer, as described in more detail in regard to FIG. 15.

Although the step 803 has, in the previous description, used controls on the mouse 903, the tool tip filter criteria can also be defined using a keyboard 902 (see FIG. 5).

Figure 2:
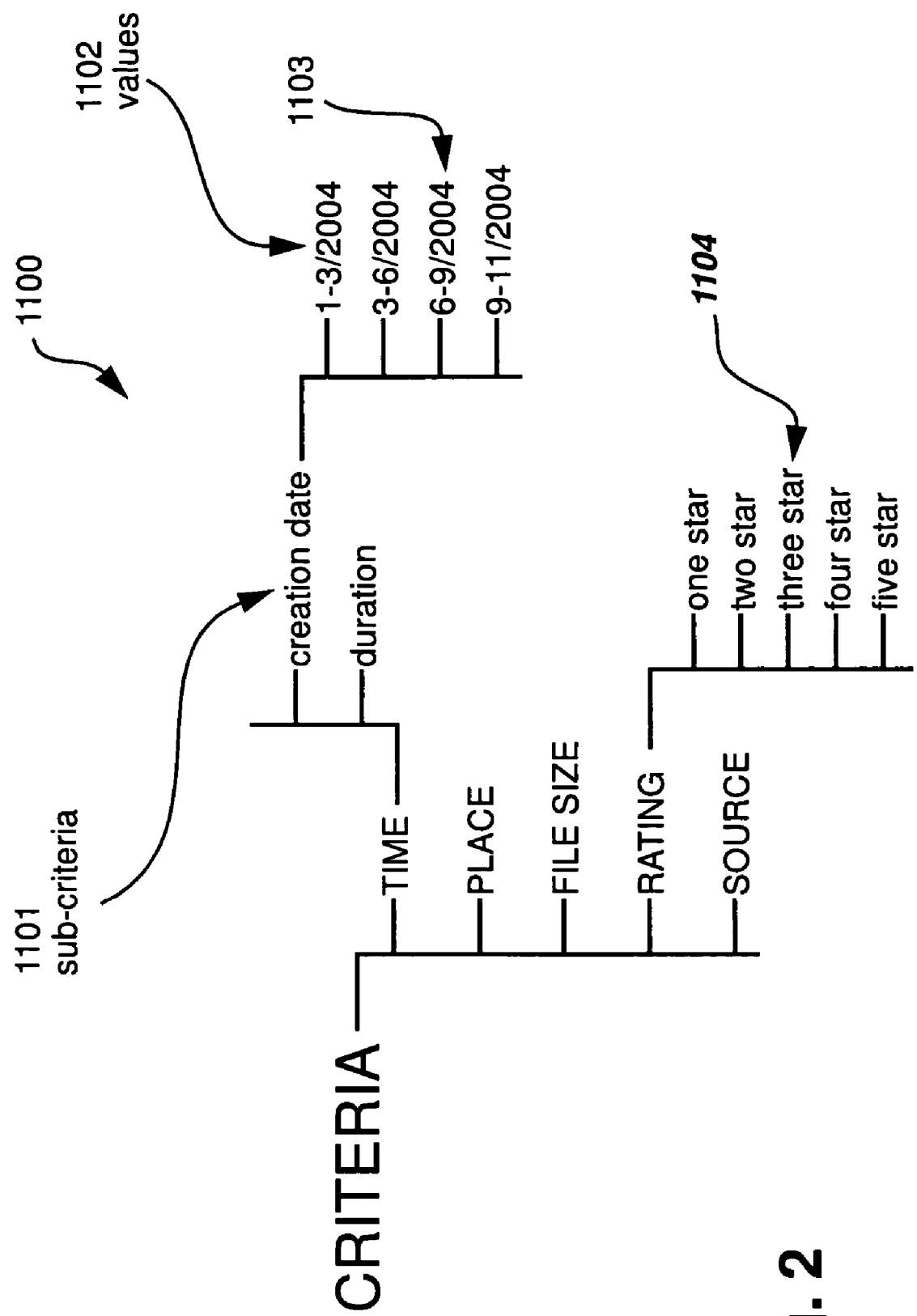
FIG. 2 shows terminology used to define exemplary filter criteria used in one arrangement of the tool tip browsing arrangement.

FIG. 2 shows terminology used to define exemplary filter criteria used in one arrangement of the tool tip browsing arrangement. In the depicted example, available filter criteria include TIME, PLACE, FILE SIZE, RATING and SOURCE. Criteria can have sub-criteria, and thus the criterion TIME can have sub-criteria CREATION DATE and DURATION. Sub-criteria (or sub-sub-criteria, if appropriate) ultimately have value, and thus the sub-criterion CREATION DATE can, in one arrangement, define 3-month periods as shown. If a media file is created on 1 Jul. 2004, then that file satisfies a filter 1003 that is defined as follows:

Criterion->time; sub-criterion->creation date;
value->6-9/2004    [1]

A media item that has been defined, using associated metadata, to have a three-star rating (eg see 230 in FIG. 7), satisfies a filter 1104 that is defined as follows:

Criterion->rating; value->three-star    [2]

Figure 3:
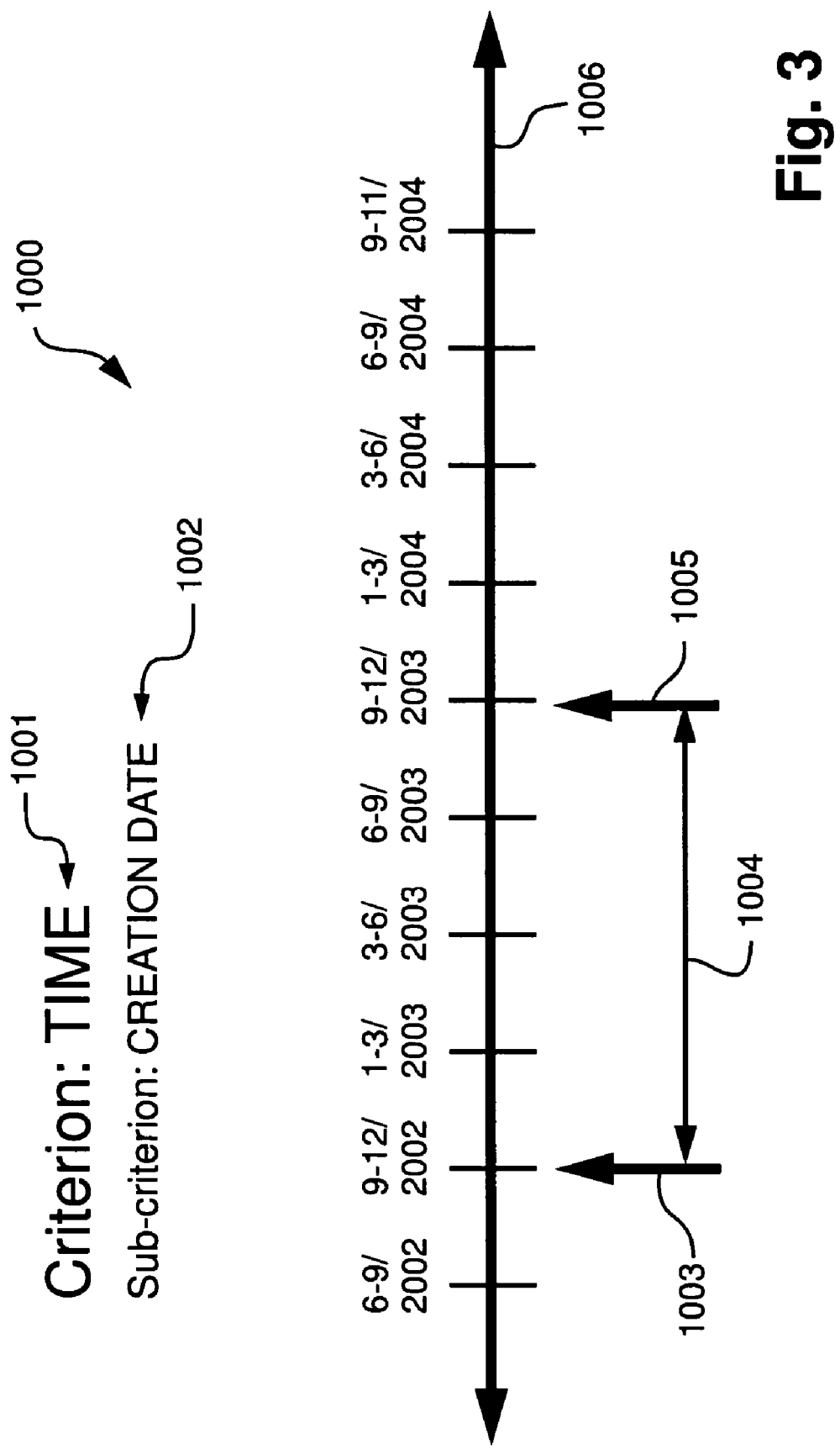
FIG. 3 shows one example of a tool tip filter adjustment arrangement.

When performing the step 803 to define the tool tip filter criteria, it is desirable for the user to have a feedback mechanism enabling him or her to see how the various criteria are being changed. Thus, for example, if a tool tip filter is to be changed from:

Criterion->time; sub-criterion->creation date;
value->9-12/2002    [3]

to:

Criterion->time; sub-criterion->creation date;
value->9-12/2003    [4]

then the step 803 can cause a display as shown in FIG. 3 to be displayed on the video display 914. The display can be shown in the graphical form of FIG. 3 or alternately can be displayed in tabular text form.

FIG. 3 shows one example 1000 of a tool tip filter adjustment arrangement comprising a filter criterion TIME, a sub-criterion CREATION DATE, and associated values 6-9/2002 through to 9-12/2004. A filter adjustment scale 1006 is also shown. Beneath the scale 1006 is a scale pointer 1003 showing the current filter value, which is 9-12/2002. The pointer 1003 can be dragged, using the mouse 903, through a distance 1004 to a new position 1005 thereby changing the value to 9-12/2003. After the aforementioned filter adjustment is performed in the step 803 of FIG. 1, only media items which were captured in the time span September through December 2003 will be displayed in the pop-up window according to the tool tip browsing method.

Figure 4:
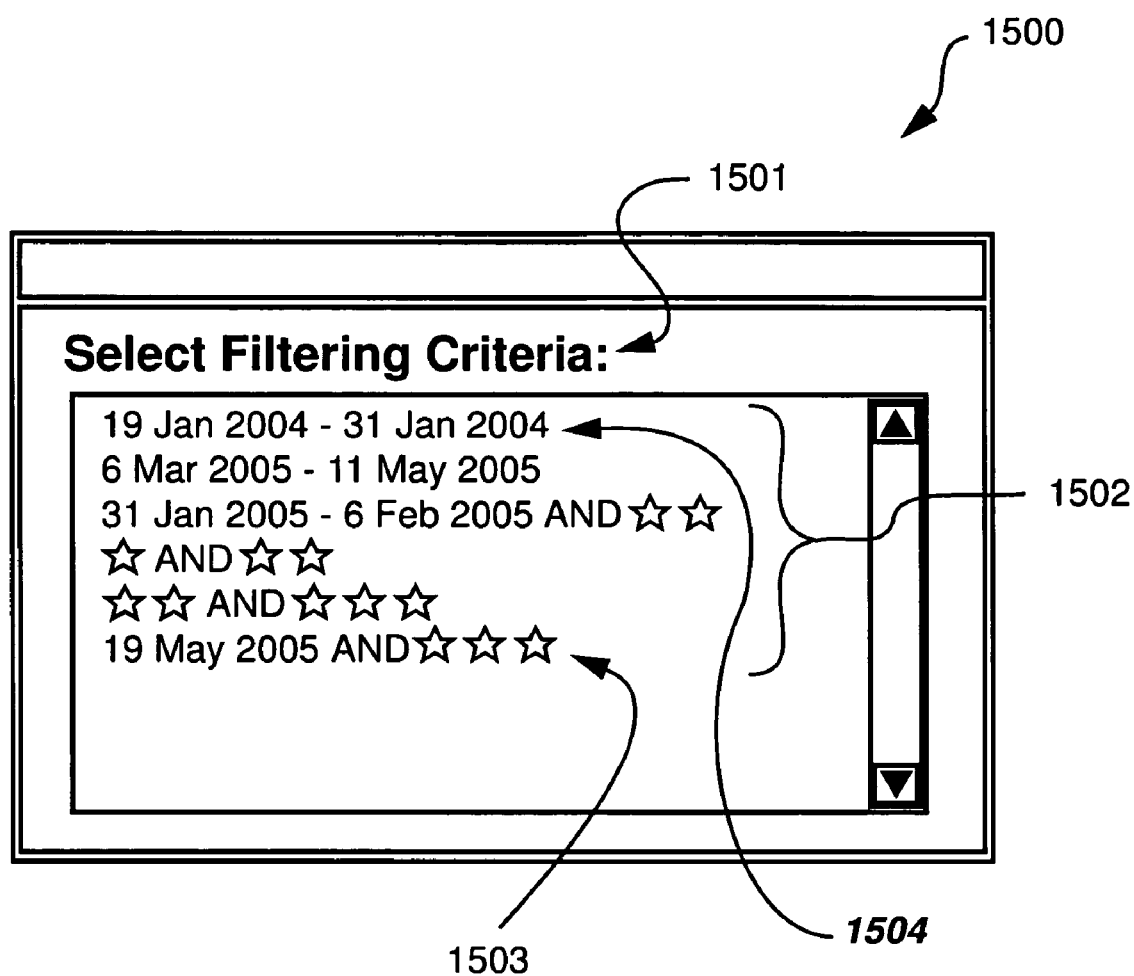
FIG. 4 depicts how a combination of tool-tip filter criteria can be selected.

FIG. 4 depicts how a combination of tool-tip filter criteria can be selected. As described in relation to FIG. 3, individual tool-tip filter criteria can be defined according to the graphical pointer arrangement shown. Similarly, other filter criteria depicted in FIG. 2, namely criteria relating to TIME, PLACE, FILE SIZE, RATING, SOURCE and others (not shown) can be selected using appropriate graphical user interfaces (not shown) or using keyboard commands. Once all the aforementioned individual filter criteria have been defined, the user can elect to apply all or some of them in combination. FIG. 4 shows an arrangement 1500 in which some or all of the individual filter criteria that have been defined can be selected for operation. The user can, by making use of the mouse wheel and/or keyboard commands, set up logical combinations of previously selected criteria 1502. Thus, for example, the user can select only the previously defined criterion 1503 (ie all files created on 19 May 2005 and having a three star rating). Alternately, the user can select a boolean combination of previously defined criteria such as, for example 1503 and 1504 as follows:

All files
created on 19 May 2005 AND having a three star rating OR
created between 19 Jan. 2004 and 31 Jan. 2004

It is also possible to use the aforementioned capability iteratively, so that previously selected combinations of filter criteria can themselves appear as entries in the arrangement 1500 to be used for future selection.

FIG. 5 is a functional block diagram of a general-purpose computer system 900 upon which described tool tip browsing methods can be practiced. The tool tip browsing method particularly lends itself to implementation on a general-purpose computer system 900, such as that shown in FIG. 5 wherein the tool tip browsing processes of FIGS. 1 and 12-14 may be implemented as software, such as an application program executing within the computer system 900. In particular, the steps of the tool tip browsing methods are effected by instructions in the software that are carried out by a computer 901. The instructions may be formed as one or more code modules, each for performing one or more particular tasks. The software may also be divided into two separate parts, in which a first part performs the tool tip browsing methods and a second part manages a user interface between the first part and the user. The software may be stored in a computer readable medium, including the storage devices described below, for example. The software is loaded into the computer 901 from the computer readable medium, and then executed by the computer 901. A computer readable medium having such software or computer program recorded on it is a computer program product. The use of the computer program product in the computer 901 preferably effects an advantageous apparatus for practicing the tool tip browsing methods.

The computer system 900 comprises the computer module 901, input devices such as the keyboard 902 and the mouse 903, output devices including a printer 915, the display device 914 and loudspeakers 917. A Modulator-Demodulator (Modem) transceiver device 916 is used by the computer module 901 for communicating to and from a communications network 920, for example connectable via a telephone line 921 or other functional medium. The modem 916 can be used to obtain access to the Internet, and other network systems, such as a Local Area Network (LAN) or a Wide Area Network (WAN), and may be incorporated into the computer module 901 in some implementations.

The computer module 901 typically includes at least one processor unit 905, and a memory unit 906, for example formed from semiconductor random access memory (RAM) and read only memory (ROM). The module 901 also includes a number of input/output (I/O) interfaces including an audio-video interface 907 that couples to the video display 914 and the loudspeakers 917, an I/O interface 913 for the keyboard 902 and the mouse 903, and optionally a joystick (not illustrated), and an interface 908 for the modem 916 and printer 915. In some implementations, the modem 9116 may be incorporated within the computer module 901, for example within the interface 908. A storage device 909 is provided and typically includes a hard disk drive 910 and a floppy disk drive 911. A magnetic tape drive (not illustrated) may also be used. A CD-ROM drive 912 is typically provided as a non-volatile source of data. The components 905 to 913 of the computer module 901, typically communicate via an interconnected bus 904 and in a manner that results in a conventional mode of operation of the computer system 900 known to those in the relevant art. Examples of computers on which the described arrangements can be practiced include IBM-PC's and compatibles, Sun Sparcstations or similar computer systems evolved therefrom.

Typically, the application program is resident on the hard disk drive 910 and read and controlled in its execution by the processor 905. Intermediate storage of the program and any data fetched from the network 920 may be accomplished using the semiconductor memory 906, possibly in concert with the hard disk drive 910. In some instances, the application program may be supplied to the user encoded on a CD-ROM or floppy disk and read via the corresponding drive 912 or 911, or alternatively may be read by the user from the network 920 via the modem device 916. Still further, the software can also be loaded into the computer system 900 from other computer readable media. The term "computer readable medium" as used herein refers to any storage or transmission medium that participates in providing instructions and/or data to the computer system 900 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 901. Examples of transmission media include radio or infrared transmission channels as well as a network connection to another computer or networked device, and the Internet or Intranets including e-mail transmissions and information recorded on Websites and the like.

The tool tip browsing methods may alternatively be implemented in dedicated hardware such as one or more integrated circuits performing the functions or sub functions of the disclosed tool tip browsing methods. Such dedicated hardware may include graphic processors, digital signal processors, or one or more microprocessors and associated memories.

Figure 6:
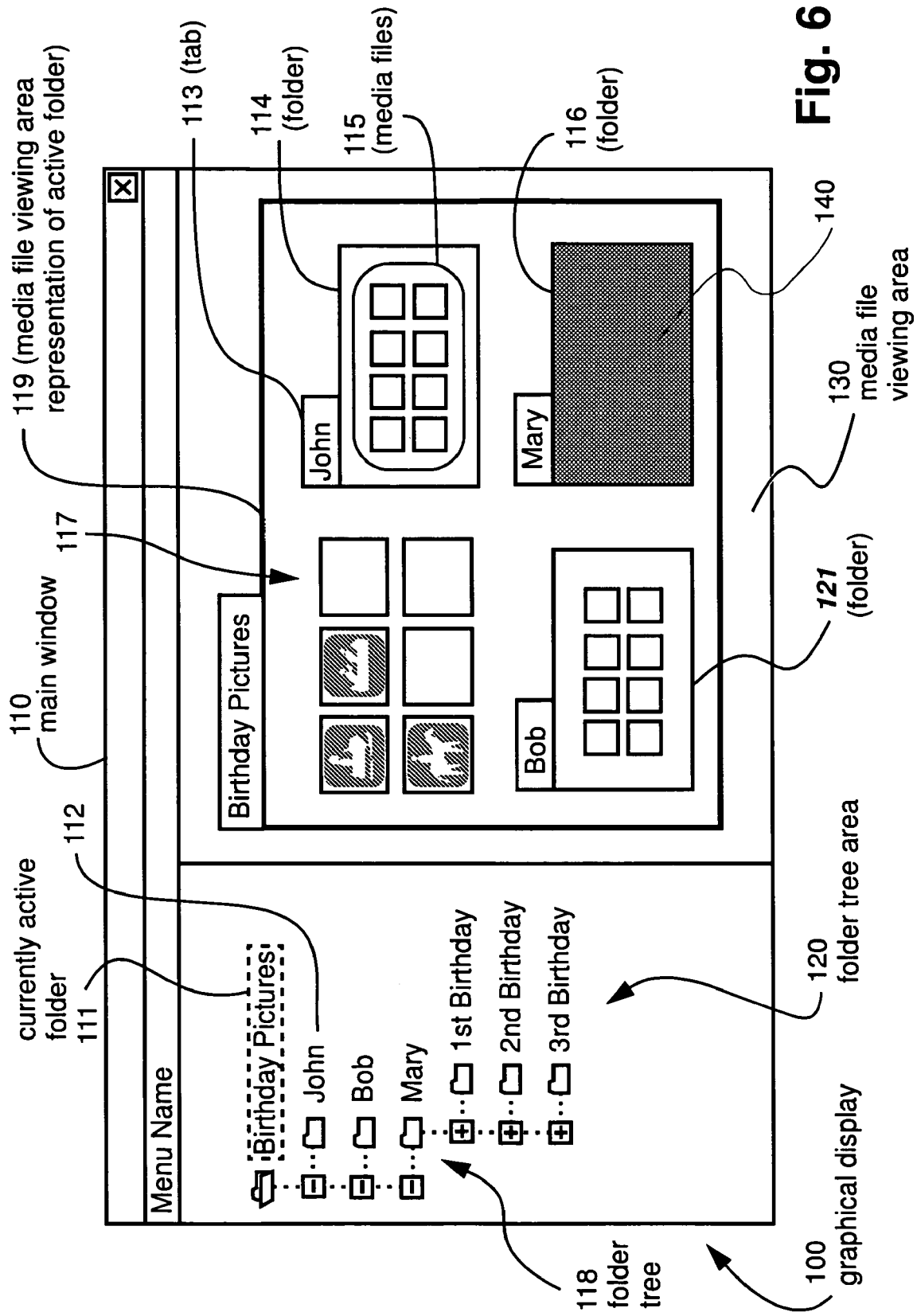
FIG. 6 shows a graphical display presented by a media browsing application incorporating the tool tip browsing arrangement.

FIG. 6 shows a graphical display 100 presented by a media browsing application that can support the tool tip browsing approach. A current browser can be used to generate the display 100, and conventional browser filters can be applied. This corresponds to the step 802 in FIG. 1. The display is composed of a main window 110, the folder tree area 120, and the media file viewing area 130. Various modes of operation of the tool tip browsing approach are depicted in FIGS. 7-10, however in FIG. 6, the tool tip browsing arrangement is yet to be applied.

The folder tree area 120 shows a hierarchy of folders in the form of the folder tree 118 on the display 914 of the user's computer 901. The status of the folder 111 is "currently active", as depicted by a dashed box around the name, and the folder 111 was, in one example, made active by previously designating the folder by pointing at the folder 111 with the pointing device, and selecting it, for example, by depressing a left-hand mouse control 922.

The media file viewing area 130 displays folders and media files in the currently active folder 111. The media file viewing area 130 shows a representation 119 of the active folder 111 in the folder tree area 120. The folder representation 119 contains key frames, thumbnails or representative images 117 for each of the six visible media items in the active folder 111. The folder representation 119 also contains three folder representations 114, 116 and 121 respectively depicting the folders entitled "John", "Bob", and "Mary" in the folder tree area 120. The folder 114 has a tab 113 depicting the name of the folder, this being "John". The folder 114 for "John" contains a number of media files 115. In an alternative arrangement for the media file viewing area 130, no visual indication is provided for the contents of sub-folders, and instead, a prefabricated bitmap (described in relation to FIG. 10) is provided.

When viewing media files, it is advantageous to show them in reduced form on-screen, in order to display the maximum useful number of media files in a given region of the display 110. However, when the number of media files is too large to display, scaled-down representations may become too small to view conveniently. In this case, a pre-defined bitmap display 140 is displayed, in order to indicate to the user that a "large" number of media items are contained in the folder 116 entitled "Mary", and thus individual representations of these media items are not being displayed. In the example of FIG. 6, the bit map 140 is displayed as soon as the number of media items (eg 115) is specified to be too large to show within the folder representation for "Mary" (ie., 116). In another arrangement, the folder representation 116 may be provided with scroll bars (not shown) to indicate that the number of media items contained in the folder "Mary" is too large to display simultaneously.

Figure 7:
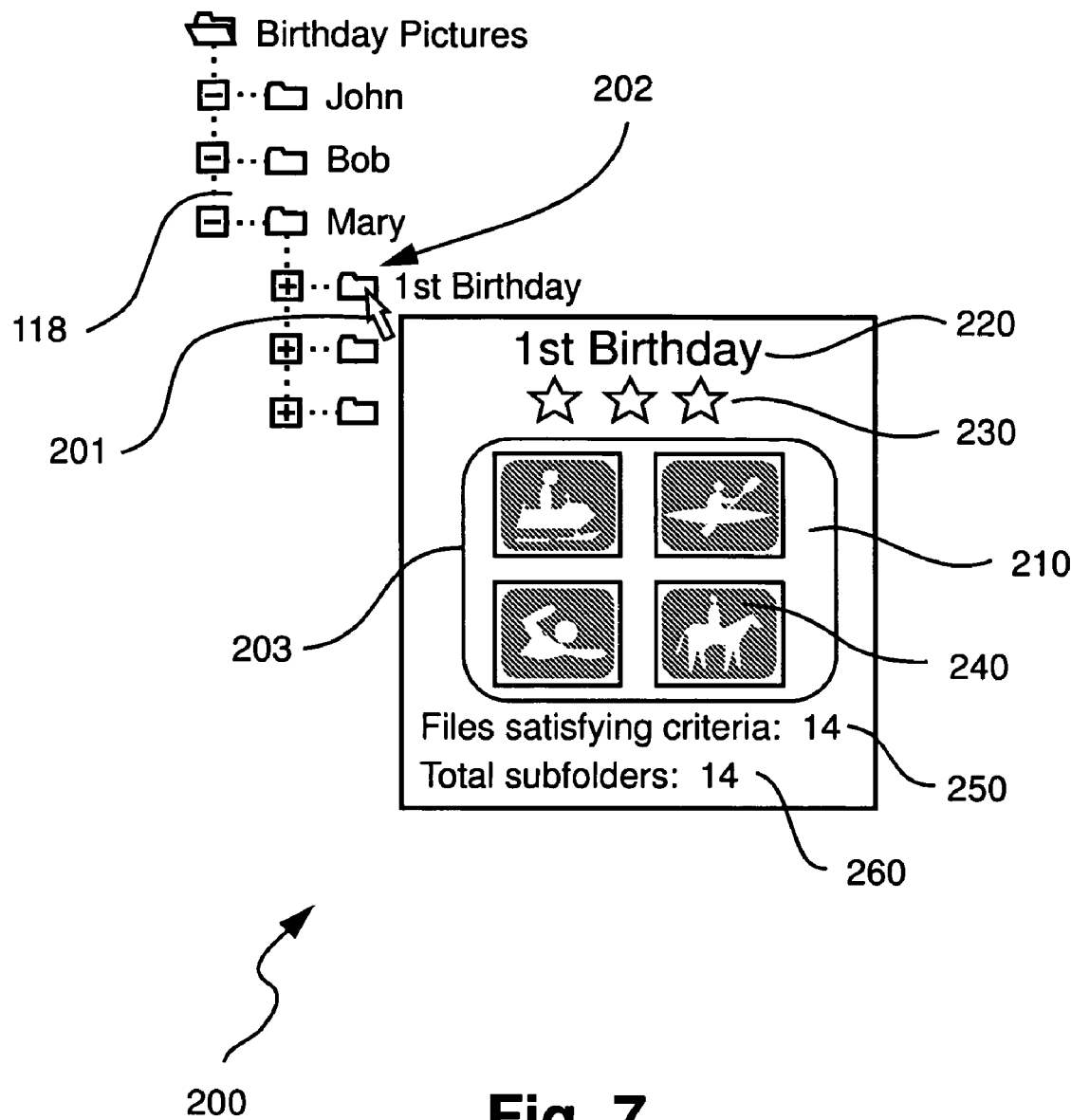
FIG. 7 shows a graphical display generated by guiding the pointing device about a folder tree area associated with displayed media content of FIG. 6.

FIG. 7 shows a graphical display 200 generated by guiding the pointing device about the folder tree area 120 in FIG. 6. The tool tip browsing arrangement has been activated, and a pointer 201 in FIG. 7 has been guided, using for instance the mouse 903 in FIG. 5 to designate a folder 202 entitled "1$^{st}$ birthday" on the folder tree 118 in the folder tree area 120. A tool tip window 210 pops up when the processor 905 determines that the folder 202 has been designated, and the window 210 displays the name 220 of the folder 202 being designated (ie being filtered), a graphical indication 230 of the filtering criteria that have been defined in the step 803 of FIG. 1, and images 203 satisfying the predetermined filtering criteria. The filtering criteria 230 are depicted by stars in the present example. This reflects the fact that in the described example the user was able, in the metadata associated with each media item, to insert a rating flag which can range from one star (indicating a low degree of interest) to five stars (indicating the greatest level of interest). The indication 230 shows that the present filter criteria set in the step 803 of FIG. 1 have been set to select all "three star" media items. The display 200 also shows at 250 that there are 14 files in the folder 202 that satisfy the defined filter criteria, and at 260 that there are a total of 14 sub-folders in the folder 202.

Figure 8:
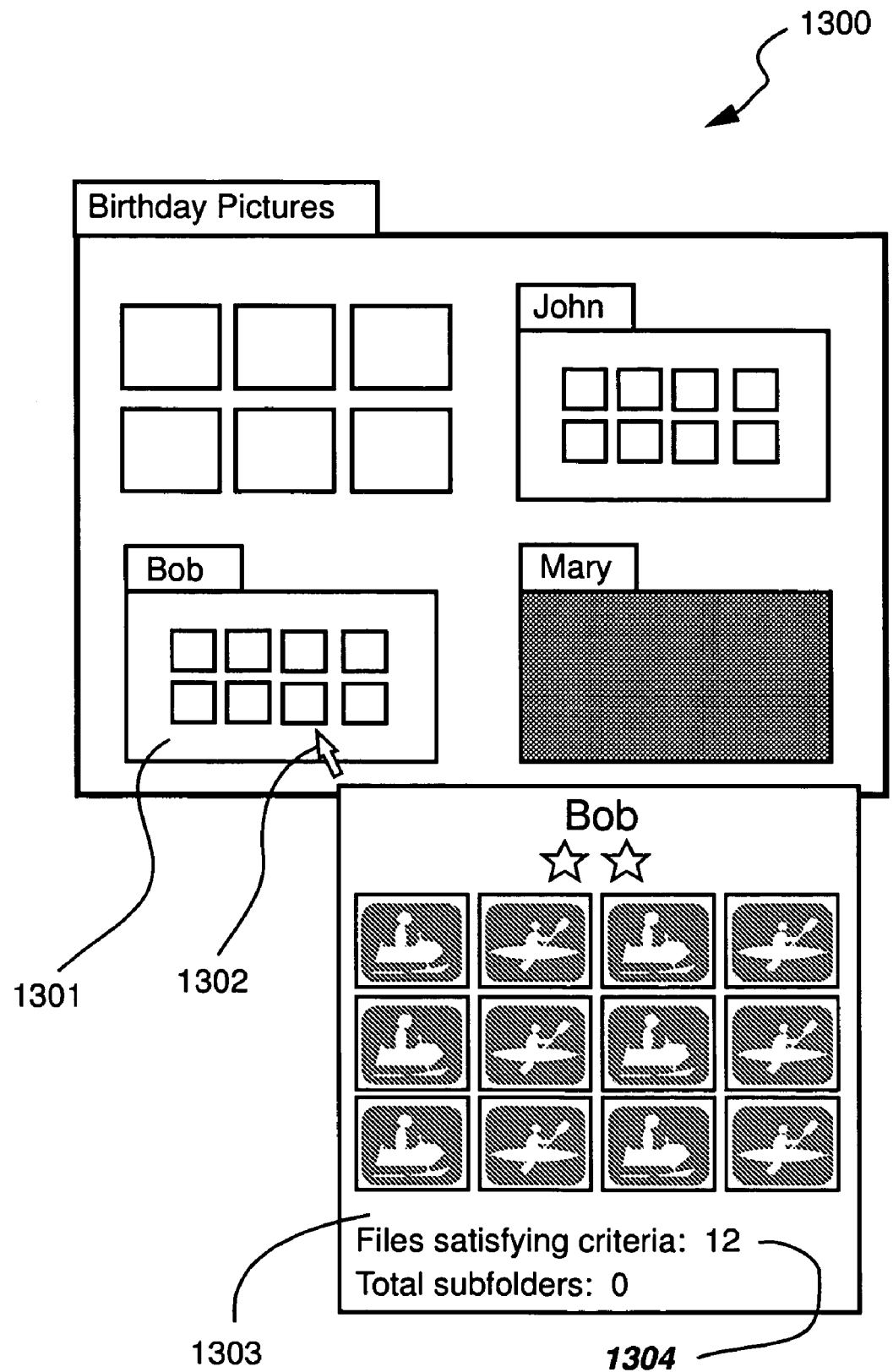
FIG. 8 shows an arrangement in which the tool-tip pop-up window expands in accordance with the number of files satisfying the tool-tip filter criteria.

FIG. 8 shows an arrangement in which the tool-tip pop-up window expands, at least to some extent, in accordance with the number of files satisfying the tool-tip filter criteria. A pointer 1302 has been guided to point at a folder 1301 and an associated pop-up window 1303 is displayed next to the pointer 1302. As indicated at 1304 there are 12 files in the folder 1301 that satisfy the defined tool-tip criteria. Unlike the situation depicted in FIG. 7, however, in which the pop-up window 210 only shows four icons 203 out of the 14 files satisfying the filter criteria (the reference numeral 250 indicates that there are 14 files satisfying these criteria), the pop-up window 1303 has expanded to show all 12 files satisfying the filter criteria (see 1304) in the present example.

Figure 9:
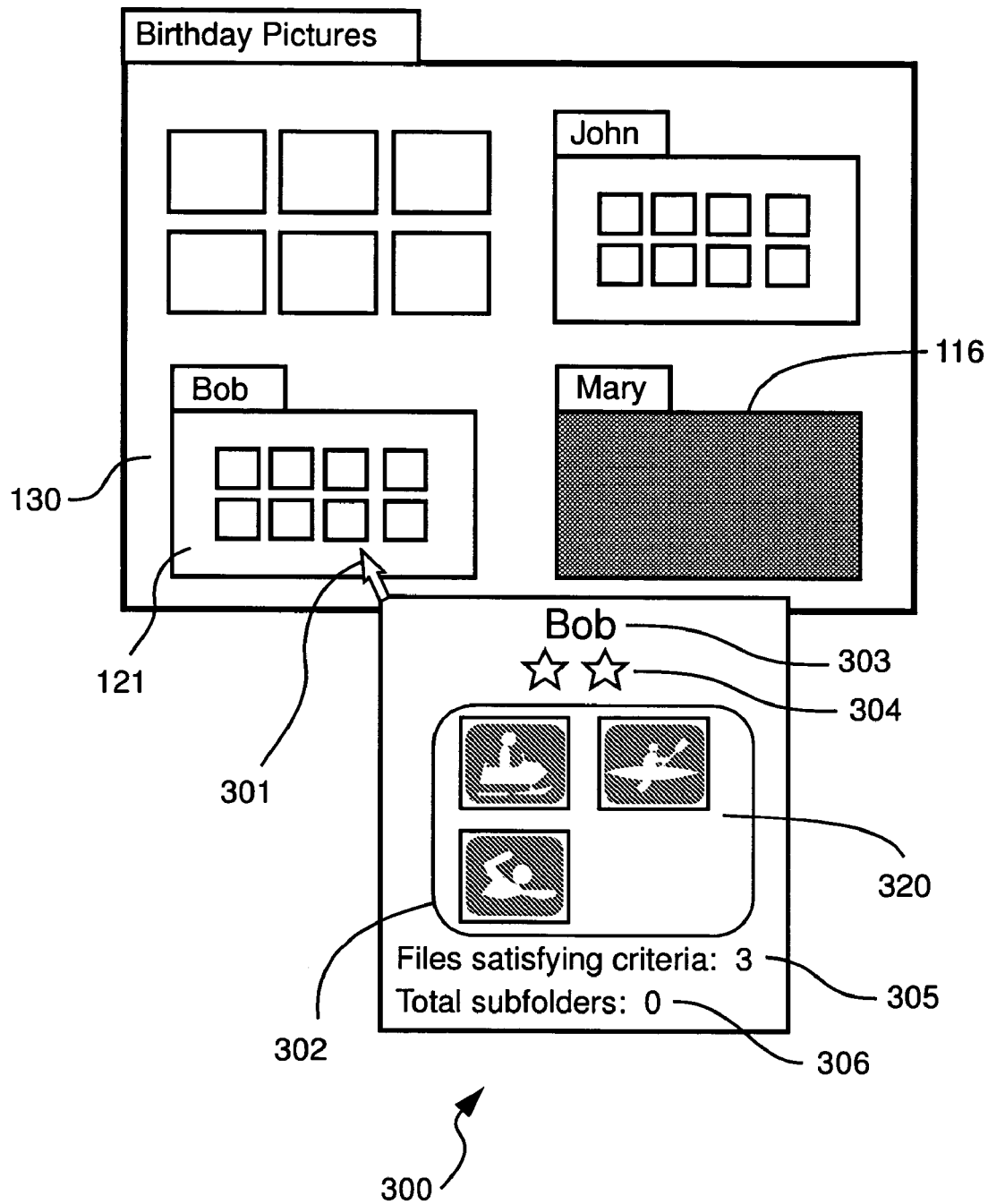
FIG. 9 shows a graphical display generated by guiding the pointing device about a media file viewing area associated with displayed media content of FIG. 6.

FIG. 9 shows a graphical display 300 generated by guiding the pointing device about the media file viewing area 130 of FIG. 6. The pointing device pointer 301 has been guided to point at the folder for "Bob", and a pop-up window 320 that is associated with the pointer 301 shows the name 303 of the folder (ie., "Bob"), a rating 304 indicating that it is two star images that are presently of interest, a number 305 of files in the folder 121 which satisfy the present filtering criteria (this being 3 files), and a number 306 of sub-folders in the folder 121 (this being zero sub-folders). Therefore, in the present example there are no sub-folders in the folder entitled "Bob". It is noted that the folder 121 entitled "Bob" contains eight images, however the tool-tip window 320 contains only three images 302 that meet the defined tool tip filtering criteria.

Figure 10:
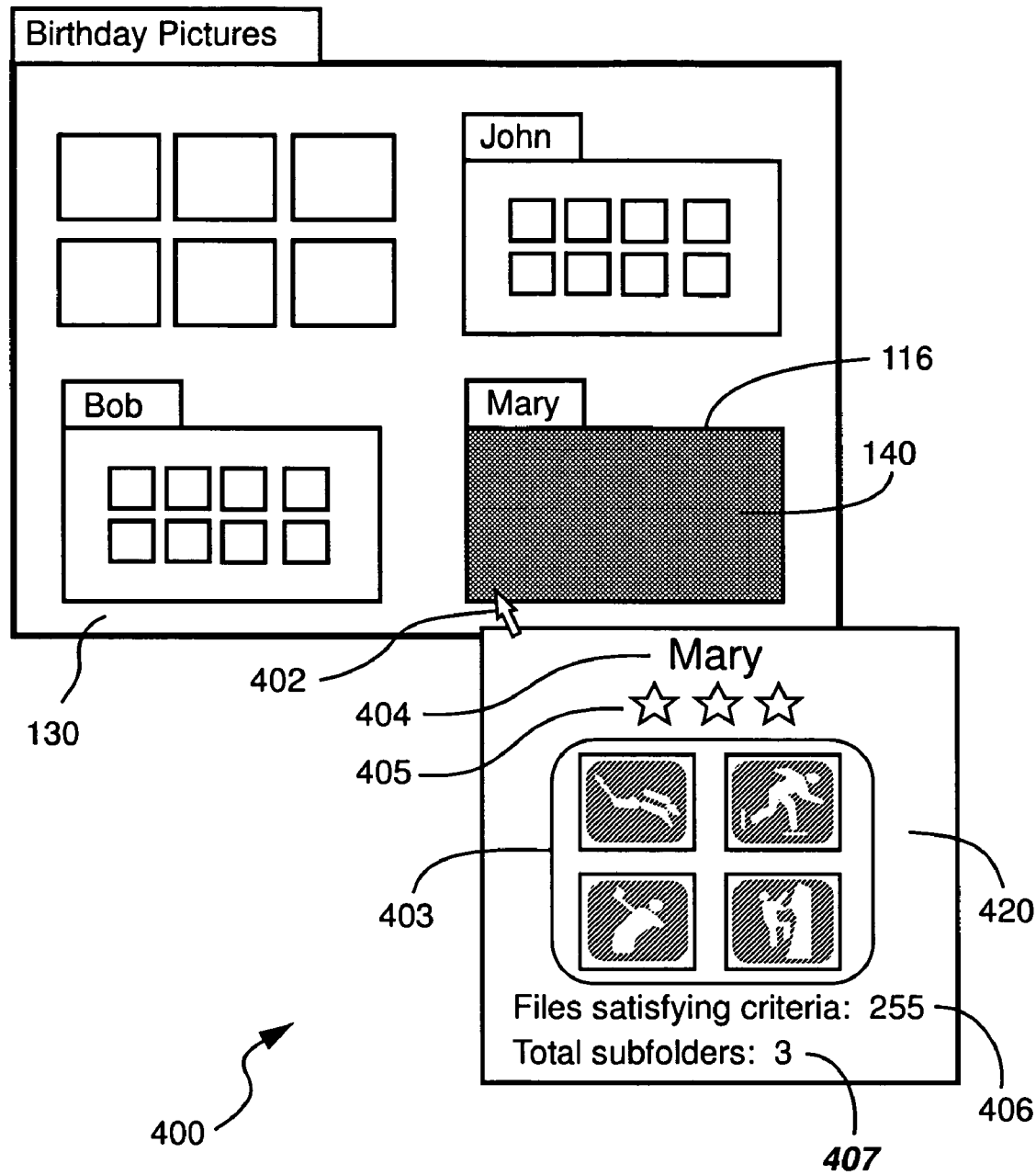
FIG. 10 shows a graphical display generated by guiding the pointing device about a bit map representation of a media item in the media file viewing area associated with media content of FIG. 6.

FIG. 10 shows a graphical display 400 generated by guiding the pointing device about the bit map representation 140 of in the media file viewing area 130 of FIG. 6. The folder 116 shows the pre-fabricated bitmap 140 to represent the large number of media files contained within the folder 116. A pointer 402 has been guided by using the mouse 903 in FIG. 5 to designate the folder 116 entitled "Mary". An associated tool tip pop-up window 420 displays the name 404 of the folder (ie., "Mary"), a rating 405 that has been defined at the step 803 in FIG. 1, this rating being a "three star" rating, and representations 403 of some media items that meet the aforementioned filter criteria. The tool tip window can also have scroll bars (see FIG. 11), adjustable for example using the mouse "wheel", to enable the user view other media items that meet the aforementioned filter criteria. The pop-up window 420 also shows the number 406 of media items in the folder 116 that satisfy the filter criteria 405 (this being 255 media items). The pop-up window 420 also shows the total number 407 of sub-folders in the folder 116 (this being 3 sub-folders).

Figure 11:
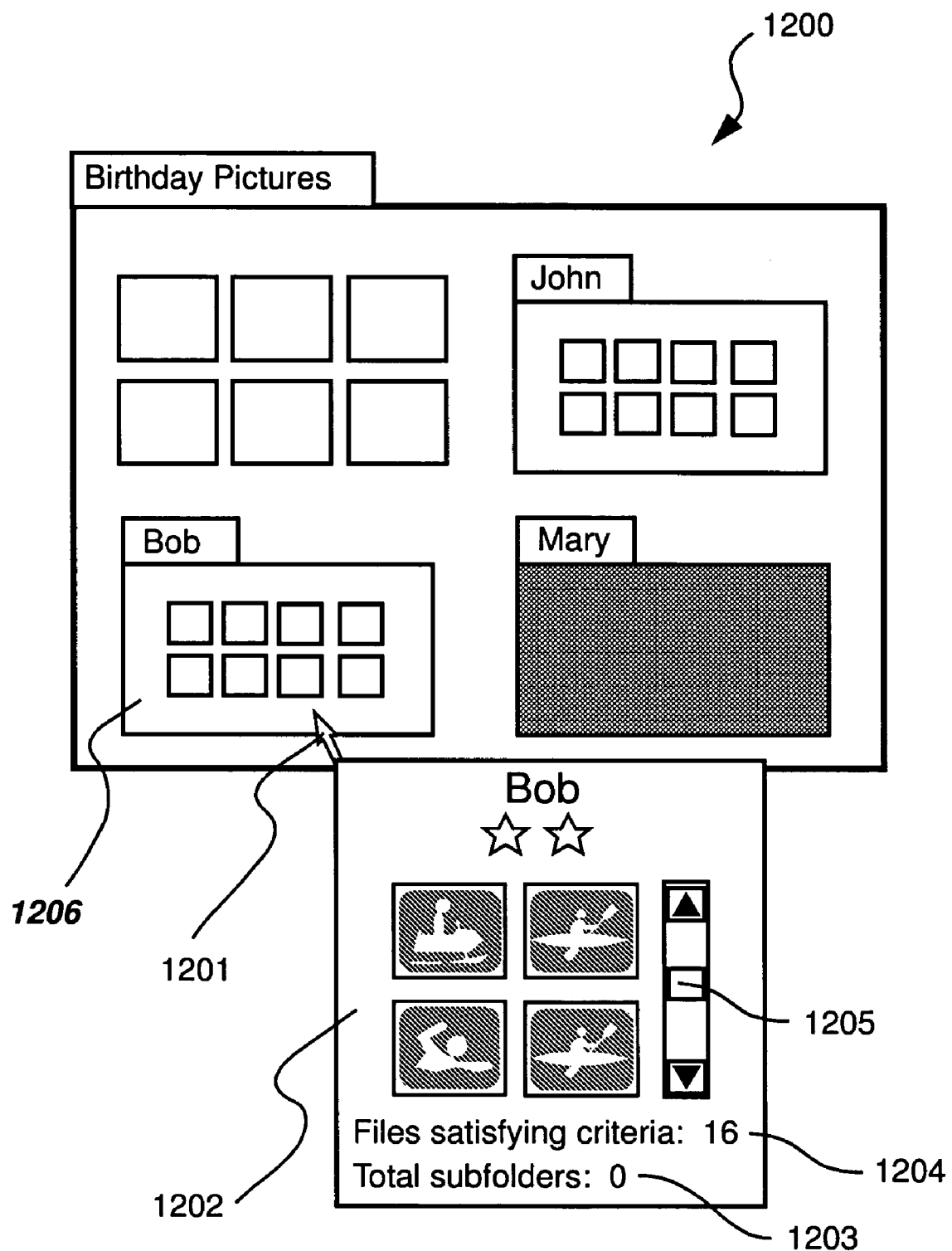
FIG. 11 shows a tool-tip pop-up window having a scroll bar to enable local navigation among displayed files in the pop-up window.

FIG. 11 shows another example of a pointer 1201 that has been guided to point at a folder 1206 (entitled "Bob"). An associated pop-up window 1202 indicates at 1204 that there are 16 files in the "Bob" folder satisfying the define filter criteria, however the pop-up window 1202 only shows four of these files. A scroll bar 1205 is however provided, operable using the mouse wheel or keyboard or other mechanism, for scrolling up and down to reveal other files satisfying the tool-tip filter criteria.

Figure 12:
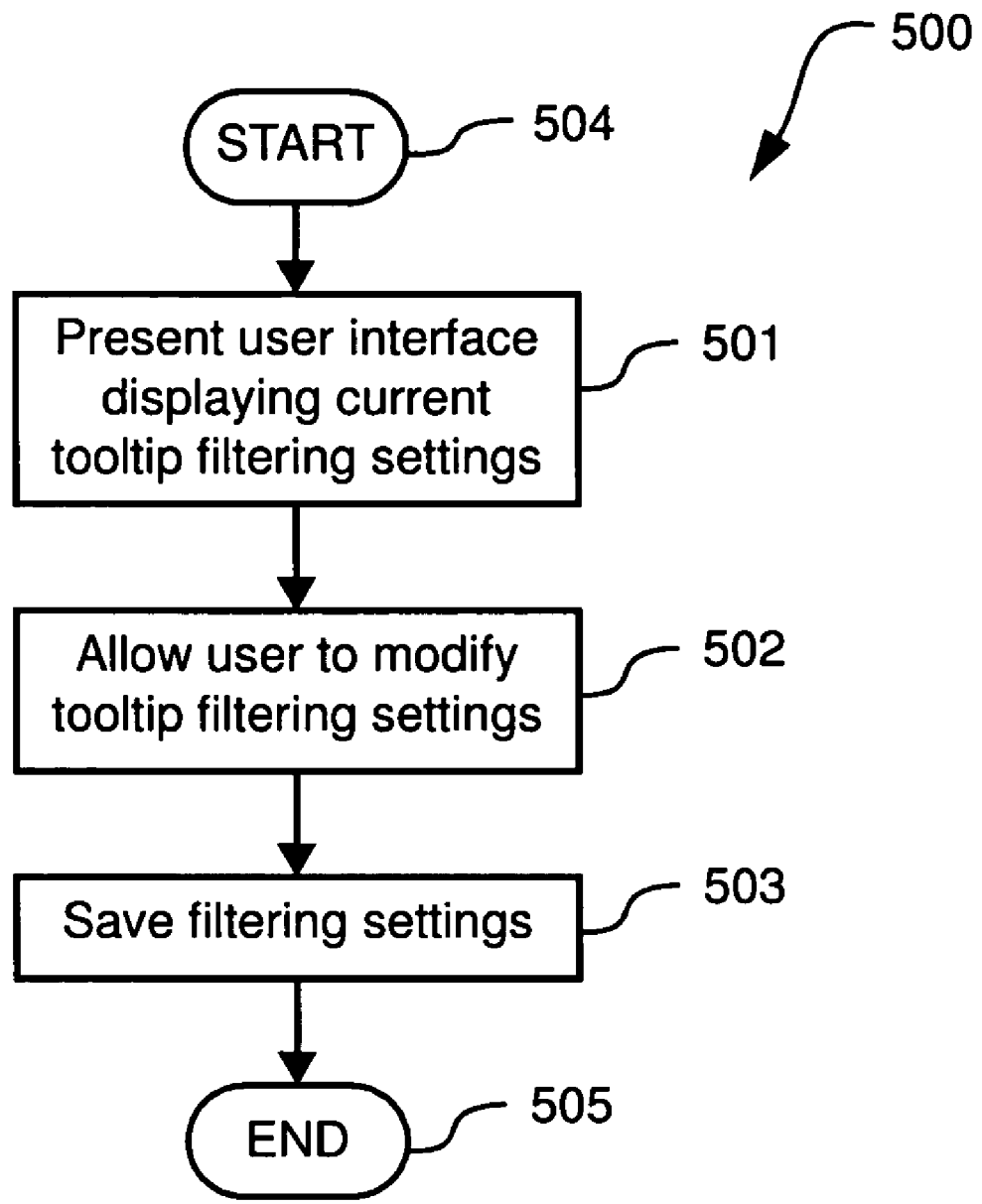
FIG. 12 is a flow chart of a process for saving tool tip filter settings.

FIG. 12 is a flow chart of a process 500 for saving tool tip filter settings. The process 500 can be used to implement the step 803 in FIG. 1. The process 500 commences with a START step 504, after which a step 501 invokes a SAVE TOOL TIP FILTERING SETTING FUNCTION. The user is then presented on the display 914 with an interface showing current tool tip filtering settings, after which in a step 502 the aforementioned settings can be adjusted in order to define the desired tool tip filter 5 criteria. A following step 503 saves any changes made to the filter criteria after which the process 500 terminates with an END step 505.

The amended filter settings are stored in a persistent fashion in the storage device 906 in FIG. 5, so the tool tip browsing application is able to access the settings on subsequent executions of the application. The tool tip filter settings can be made user dependent, so that each user of the computer 901 can store their own personal settings.

Figure 13:
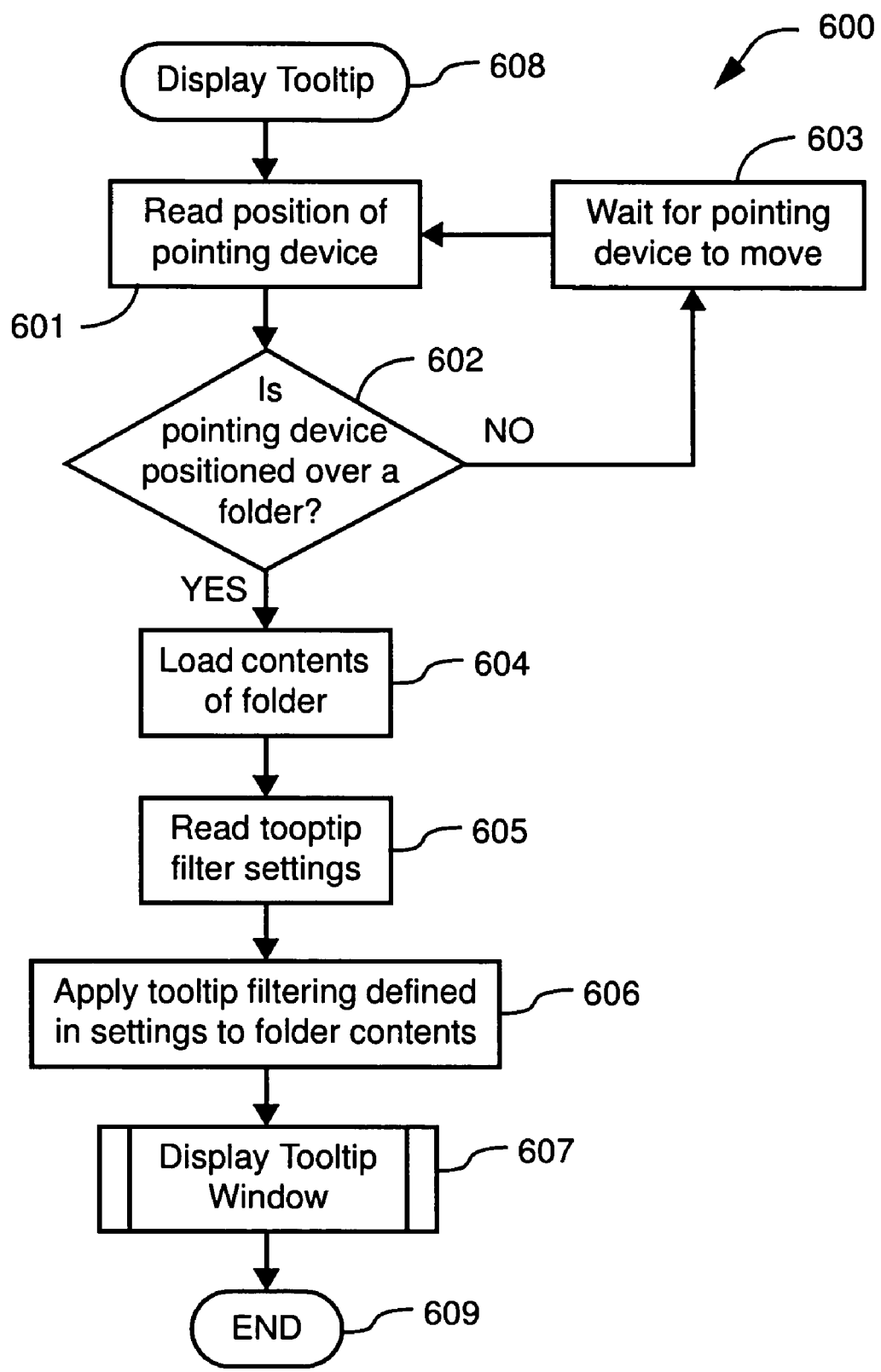
FIG. 13 is a flow chart of a process for operating the tool tip browsing method.

FIG. 13 shows a process 600 for operating the tool tip arrangement in the step 804 of FIG. 1. The process 600 commences with a DISPLAY TOOL TIP step 608, after which a step 601 determines the position of the pointer (such as 402 in FIG. 10) on the display 914. A following testing step 602 determines if the pointer is sufficiently close to a folder to designate that folder. Thus, in FIG. 10 for example, the pointer 402 needs to be within less than a predetermined distance from the folder 116 in order for the processor 905 to conclude that the folder 116 is being designated.

Although the present description has generally been directed to designation of folders containing media items, it is noted that a media item can itself be designated, in which case if the designated media item meets the present tool tip filter criteria, then the media item itself will appear in the pop-up window. If, on the other hand, the designated media item does not meet the present tool tip filter criteria, then the pop-up window will be blank.

Returning to FIG. 13, if the step 602 determines that the pointer is not designating a particular folder, then the process 600 is directed by a NO arrow to a step 603 which waits for a predefined period for the pointing device 903 to move, after which the process 600 is directed back to the step 601. If, on the other hand, the step 602 returns a logical TRUE value, then the designated folder is marked as the "target folder". The folder 202 entitled "1$^{st}$ birthday" in FIG. 7 is such a target folder. Once the folder is marked as a target folder, a subsequent step 604 loads the media items referenced by the target folder into the memory 906. The step 604 loads both sub-folders and media files referenced by the aforementioned target folder, and these are stored in an unfiltered collection. Thereafter a step 605 loads the current tool tip filter settings which were saved in the step 503 of FIG. 12. These settings are used to define the filtering criteria used when displaying the tool tip pop-up window. A following step 606 uses these filtering criteria to filter the unfiltered collection loaded in the step 604, thereby producing a filtered collection. This "filtered collection" contains only those contents that satisfy the filtering criteria of the tool tip. The information 407 defining the total number of enclosed sub-folders in FIG. 10 preferably counts all sub-folders in the folder being designated. Alternately, the information 407 can define only those sub-folders in the designated folder satisfying the filtering criteria.

A following step 607 displays the tool tip window as will be described in regard to FIG. 14. Thereafter, the process 600 terminates with an END step 609 when, according to one arrangement, the tool tip window becomes hidden after a pre-determined time period elapses. Alternately, after the user moves the pointer a pre-determined distance from the previously designated folder, the tool tip window ceases to be displayed.

Figure 14:
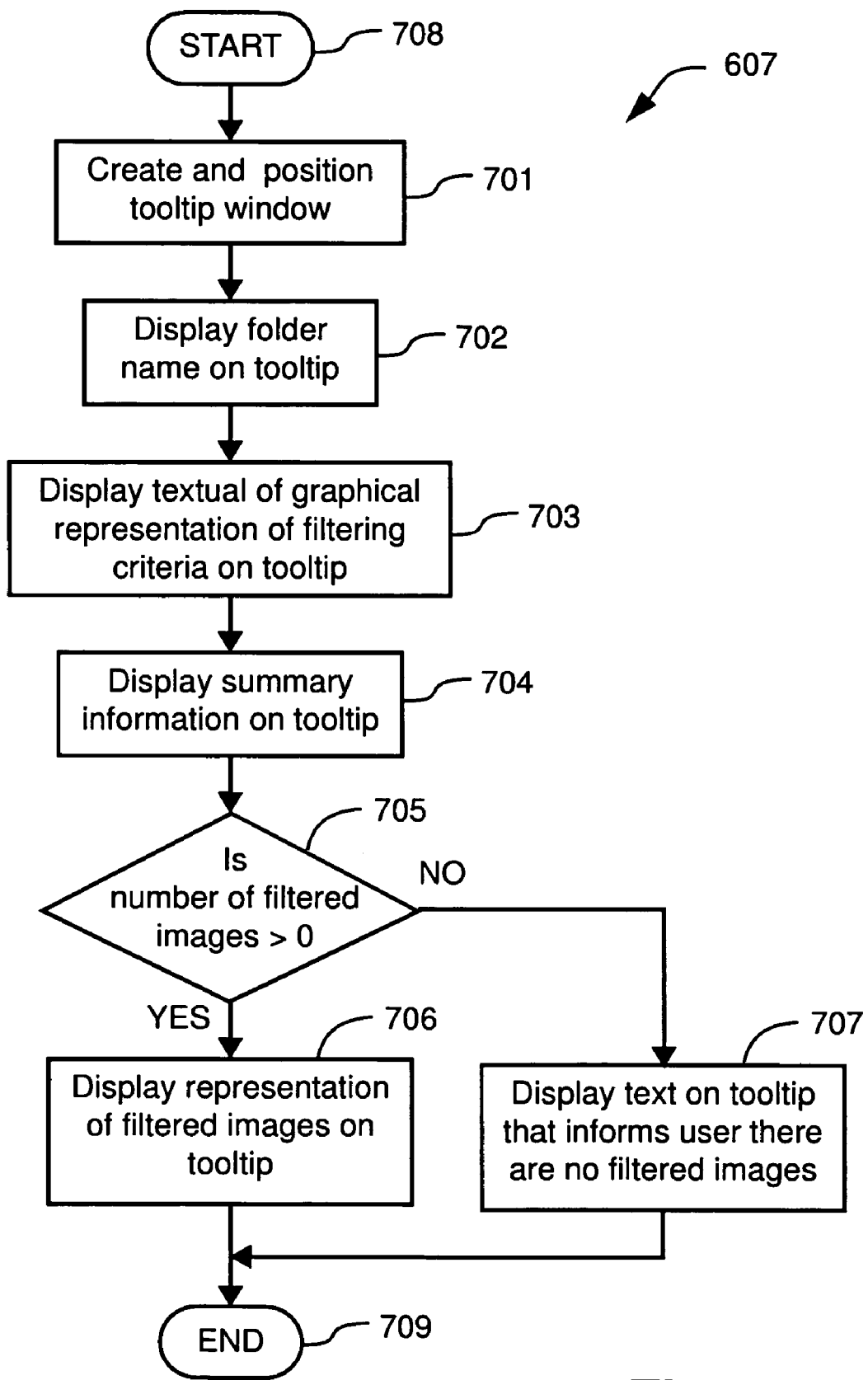
FIG. 14 is a flow chart of the sub-process in FIG. 13 relating to creation of the tool tip pop-up window.

FIG. 14 shows the process 607 of FIG. 13 in more detail. The process 607 creates the pop-up window for the tool tip, and according to the preferred arrangement, positions the pop-up window near the pointer. The process 607 commences with a START step 708, after which a step 701 creates the pop-up window for the tool tip and positions it near the pointer (such as 402 in FIG. 10). A following step 702 writes the name of the target folder (eg., 220 in FIG. 7) in the window. A following step 703 inserts a graphical or textual representation of the filtering criteria (eg., 230 in FIG. 7) into the pop-up window. Thus, for example, if the user was filtering to identify only "three star" images in the tool tip, then the three star-shaped graphical objects 230 can be displayed, as shown in FIG. 7, to represent the filtering criteria. A following step 704 inserts the summary count 260 (see FIG. 7) of sub-folders in the target folder (this indicating that there are 14 sub-folders in the folder 202), and the number 250 of media files in the target folder that satisfy the filter criteria (this indicating that there are 14 files satisfying the tool tip filter criteria contained in the target folder and/or in all the sub-folders contained in the target folder). As previously noted in regard to FIG. 7, the depth of filtering can be set to a pre-determined number of hierarchical levels, and this will place a limit on the search performed in order to determine the number of media files in the target folder, and the number of sub-folders in the target folder.

A following testing step 705 determines if the number of filtered images in the pop-up window (eg., 203 in FIG. 7) is greater than 0. If this is the case, then the process 607 follows a YES arrow to a step 706 that displays representations of the filtered images in the pop-up window. Thereafter, the process 607 terminates at an END step 709. Returning to the step 705, if the step returns a logical FALSE value, then the process 607 follows a NO arrow to a step 707. The step 707 displays text in the pop-up window informing the user that there are no filtered images satisfying the current tool tip filter criteria. Following the step 707, the process 607 is directed to the end step 709.

The step 706 displays either representations of all media items meeting the current tool tip filter criteria, or a subset thereof. Typically, no more than four representations of media items are presented in the pop-up window. In another arrangement, the pop-up window can be provided with scroll bars enabling the user to view media items meeting the tool tip filter criteria which are nonetheless displayed in the pop-up window.

Figure 15:
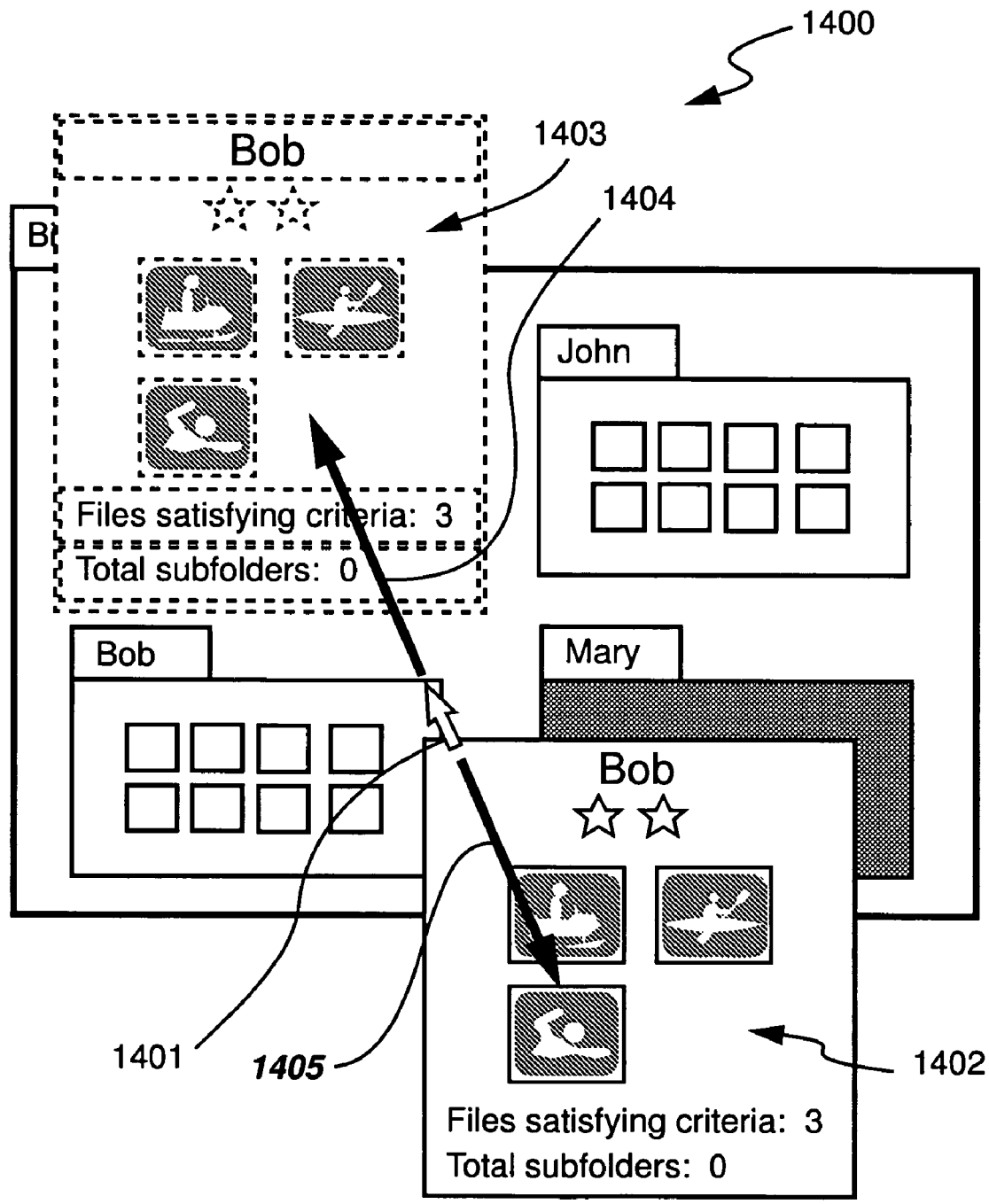
FIG. 15 relates to the relative location of the pop-up window and the pointer.

FIG. 15 relates to the relative location of the pop-up window and the pointer. As noted in regard to FIG. 10, in one arrangement the pop-up window 420 is located near the pointer 402. FIG. 15 shows another instance of the same arrangement in which a pop-up window 1402 is positioned near a pointer 1401. The disclosed tool-tip browsing approach allows the pointer and the pop-up window to adopt other relative positions however. Thus, for example, the pop-up window can remain in a stationary position, as depicted by a reference numeral 1403, irrespective of the position of the pointer 1401. This can, however, be disadvantageous in some situations if the pop-up window obscures a folder of interest. The pop-up window 1402 can also be positioned relative to the pointer 1401 not only as a function of the position of the pointer 1401, but also as a function of the direction in which the pointer 1401 is moved. Thus, for example, the pop-up window can be positioned next to the pointer 1401 in a leading or a trailing position. If the pointer 1401 is moved in a direction depicted by a broad arrow 1404, then the pop-up window 1402 is depicted in a trailing position. If however the pointer 1401 is moved in a direction depicted by a broad arrow 1405, then the pop-up window 1402 is depicted in a leading position. The aforementioned stationery, leading and trailing options can be selected by the user.

INDUSTRIAL APPLICABILITY

It is apparent from the above that the arrangements described are applicable to the computer and data processing industries.

The foregoing describes only some embodiments of the present invention, and modifications and/or changes can be made thereto without departing from the scope and spirit of the invention, the embodiments being illustrative and not restrictive.

Thus, although the description has been directed to use of the tool tip browsing methods and apparatus in regard to media folders containing image files, this application is only one example in which the disclosed tool tip browsing method can be used.

The invention claimed is:

1. A method of enabling a user to browse media items, said method comprising the steps of:
   (a) presenting, on a display, graphical icons representing folders containing said media items, said folders being arranged in a hierarchical tree structure; and
   (b) in response to designating one of the graphical icons with a pointer of a pointing device, displaying a window on which is displayed a thumbnail image of a media item that satisfies a filter criterion from among a plurality of media items contained in a designated folder represented by the designated graphical icon, the filter criterion including a constraint on the depth below the designated folder in the hierarchical tree structure;
   (c) defining a previous filter criterion as previously selected by the user and which is independent of the filter criterion; and
   (d) selecting for presenting by the step (a), from a set of graphical icons, those graphical icons representing folders containing media items satisfying the previous filter criterion.

2. A method according to claim 1, wherein the thumbnail image of the media item displayed in the step (b) comprises information about the number of the media items satisfying the filter criterion.

3. A method according to claim 1, wherein the thumbnail image of the media item displayed in the step (b) comprises information about the number of sub-folders in the designated icon.

4. A method according to claim 1, wherein the window is displayed in the vicinity of the pointer of the pointing device.

5. A method according to claim 4, wherein display items on the display beneath the window are at least partially visible through the window.

6. A method according to claim 1, wherein the size of the window is dependent upon the number of media items.

7. A method according to claim 1, wherein the window has a scrolling mechanism enabling different members of the plurality of thumbnail images to be displayed.

8. A method according to claim 1, wherein a location in which the window is displayed is dependent upon a direction of the pointer.

9. A method according to claim 8, wherein the window is displayed in one of a static position relative to the pointer, a trailing position relative to the pointer, and a leading position relative to the pointer.

10. A method according to claim 1, wherein if none of the media items satisfy the filter criterion, then displaying a message in the window, rather than the thumbnail image, indicating that none of the media items satisfy the filter criterion.

11. An apparatus for enabling a user to browse media items, said apparatus comprising:
   a memory storing a computer-readable program; and
   a processor executing said computer-readable program so as to execute a process for browsing said media items, the program comprising:
   (a) code for presenting, on a display, graphical icons representing folders containing said media items, said folders being arranged in a hierarchical tree structure; and
   (b) code for, in response to designating one of the graphical icons with a pointer of a pointing device, displaying a window on which is displayed a thumbnail image of a media item that satisfies a filter criterion from among a plurality of media items contained in a designated folder represented by the designated graphical icon, the filter criterion including a constraint on the depth below the designated folder in the hierarchical tree structure;
   (c) code for defining a previous filter criterion as previously selected by the user and which is independent of the filter criterion; and
   (d) code for selecting for presenting by the step (a), from a set of graphical icons, those graphical icons representing folders containing media items satisfying the previous filter criterion.

12. A computer-readable storage medium having recorded thereon a computer-executable program, said computer-executable program being executable by a computer so as to control the computer to execute a method for enabling a user to browse media items, said computer-executable program comprising:

(a) code for presenting, on a display, graphical icons representing folders containing said media items, said folders being arranged in a hierarchical tree structure; and (b) code for, in response to designating one of the graphical icons with a pointer of a pointing device, displaying a window on which is displayed a thumbnail image of a media item that satisfies a filter criterion from among a plurality of media items contained in a designated folder represented by the designated graphical icon, the filter criterion including a constraint on the depth below the designated folder in the hierarchical tree structure;

(c) code for defining a previous filter criterion as previously selected by the user and which is independent of the filter criterion; and (d) code for selecting for presenting by the step (a), from a set of graphical icons, those graphical icons representing folders containing media items satisfying the previous filter criterion.

* * * * *